US008046493B2

(12) United States Patent
Yoshida (10) Patent No.: US 8,046,493 B2
(45) Date of Patent: Oct. 25, 2011

(54) ASSET MANAGEMENT SYSTEM, ASSET MANAGEMENT METHOD, INFORMATION PROCESSOR, MANAGEMENT DEVICE, AND PROGRAM

(75) Inventor: Toyotaro Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 925 days.

(21) Appl. No.: 11/782,200

(22) Filed: Jul. 24, 2007

(65) Prior Publication Data

US 2008/0024302 A1    Jan. 31, 2008

(30) Foreign Application Priority Data

Jul. 26, 2006  (JP) .................................. 2006-203134

(51) Int. Cl.
*G06F 15/16* (2006.01)
(52) U.S. Cl. ........ 709/245; 709/227; 709/228; 709/230; 709/238; 709/246; 707/770; 707/E17.042
(58) Field of Classification Search .................... 709/245
See application file for complete search history.

(56) References Cited

U.S. PATENT DOCUMENTS

| 7,181,195 | B2 * | 2/2007 | Booth et al. ................... 455/411 |
| 2003/0169766 | A1 * | 9/2003 | Ogawa ........................... 370/466 |
| 2004/0017818 | A1 * | 1/2004 | Chung ........................... 370/401 |
| 2004/0111640 | A1 * | 6/2004 | Baum ............................. 713/201 |
| 2005/0036501 | A1 * | 2/2005 | Chung et al. .................. 370/401 |
| 2005/0086332 | A1 * | 4/2005 | Nakazawa ..................... 709/223 |
| 2005/0138661 | A1 * | 6/2005 | Matsukawa ..................... 725/62 |
| 2005/0262218 | A1 * | 11/2005 | Cox et al. ....................... 709/217 |
| 2006/0187912 | A1 * | 8/2006 | Schwartz et al. ............. 370/389 |
| 2006/0193308 | A1 * | 8/2006 | Sung ............................. 370/352 |
| 2006/0253416 | A1 * | 11/2006 | Takatsu et al. .................... 707/1 |
| 2007/0022479 | A1 * | 1/2007 | Sikdar et al. ..................... 726/22 |
| 2009/0219943 | A1 * | 9/2009 | Gobara et al. ................. 370/419 |

FOREIGN PATENT DOCUMENTS

| JP | 2000-156710 A | 6/2000 |
| JP | 2003-234828 A | 8/2003 |
| JP | 2004-023497 A | 1/2004 |
| JP | 2006-031244 A | 2/2006 |
| JP | 2006-066982 A | 3/2006 |

OTHER PUBLICATIONS

Parvin Pawar, Context-Aware Middleware Architecture for Vertical Handover Support to Multi-homed Nomadic Mobile Services, 2007, University of Twente, pp. 1-8.*
Omer Rashid, Implementing Location Based Information/Advertising for existing Mobile Phone Users in Indoor/Urban Environment, 2005, Lancaster University, pp. 1-7.*
Srisuresh, IP Network Address Translator (NAT) Terminalogy and Considerations, 1999, Lucent Technologies, pp. 1-61.*
ACM search.*

* cited by examiner

*Primary Examiner* — Krista Zele
*Assistant Examiner* — Arvin Eskandarnia
(74) *Attorney, Agent, or Firm* — Dickstein Shapiro LLP (57) ABSTRACT

An asset management system includes one or more information processors having a communication function and a management device, the information processor includes a search unit which searches for a network address converter for converting between a local IP address and a global IP address in a network, and a position information transmitting unit which transmits positional information including at least one of the global IP address of the searched network address converter and a domain name corresponding to the global IP address and identification information of the information processor to the management device, the management device includes a positional information registration unit which records the positional information received from the information processor in a position recording unit.

8 Claims, 6 Drawing Sheets

ASSET MANAGEMENT SYSTEM, ASSET MANAGEMENT METHOD, INFORMATION PROCESSOR, MANAGEMENT DEVICE, AND PROGRAM

BACKGROUNDS OF THE INVENTION

1. Technical Field

The invention relates to a technique for managing the position of an information processor that is asset of a company, and particularly to a system and a method for managing the geographical position of the information processor against the lost or stolen case.

2. Background Art

As a system for managing the position of an information processor having a communication function such as a portable personal computer, there has been proposed a system in which a position detector such as a GPS position detector is mounted on the information processor and a position information reporting mail including the position information of this processor detected by the position detector and the identification information (ID inherent in the device) of this processor is transmitted to a management device through the Internet, hence to manage the above position of each information processor on the side of the management device (for example, refer to Patent Document 1).

As a system for managing the position of electronic equipment such as IC card having no power source, there has been proposed a system in which a GPS position detector is mounted on the electronic equipment and, when this electronic equipment is installed in an access device such as a personal computer and power is supplied, the position information including the position of this equipment detected by the position detector and the IP address of an access device and the identification information of this equipment (equipment ID) are uploaded to a management device through the Internet, hence to manage the position of each electronic equipment on the side of the management device (for example, refer to Patent Document 2).

As a technique for controlling a network connection in order to ensure security of a network, there has been proposed a technique for transferring the device information of this processor (MAC address, name of machine, IP address, and the like) to a management device through the network at the timing when the information processor communicates with other device through the network, calculating a risk value based on the device information received at the side of the management device, and controlling the propriety of connection from the information processor to the network according to the calculated risk value (for example, refer to Patent Document 3).

Patent Document 1 Japanese Patent Publication Laid-Open No. 2003-234828
Patent Document 2 Japanese Patent Publication Laid-Open No. 2006-31244
Patent Document 3 Japanese Patent Publication Laid-Open No. 2006-66982

The system which controls the position with the position detector such as the GPS position detector mounted on an information processor, has a benefit that the geographical position of the information processor lost or stolen may be detected with high precision, but it has a problem that the cost is high.

Though the system which uses IP address as the positional information as shown in the Patent Document 2 is difficult to detect the position with high precision, it may reduce the cost because the position detector is not necessary. However, since the IP address assigned for an information processor is the local IP address in the environment in which the NAT (Network Address Translation) operates, the local IP address may be transferred to the management device as the positional information. The local IP address is an address which can be used freely in a plurality of network organizations and it does not correspond to the geographical position in one to one. Therefore, it is impossible to manage the accurate position of an information processor.

SUMMARY

An exemplary object of the invention is to provide a system which may manage the position of each information processor by using the global IP address which is effective as the positional information of the information processor.

A asset management system according to an exemplary aspect of the invention includes one or more information processors having a communication function and a management device, the information processor includes a search unit which searches for a network address converter for converting between a local IP address and a global IP address in a network, and a position information transmitting unit which transmits positional information including at least one of the global IP address of the searched network address converter and a domain name corresponding to the global IP address and identification information of the information processor to the management device, the management device includes a positional information registration unit which records the positional information received from the information processor in a position recording unit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

EXEMPLARY EMBODIMENT

An exemplary embodiment of the present invention will be discussed hereinafter in detail with reference to the accompanying drawings.

Figure 1:
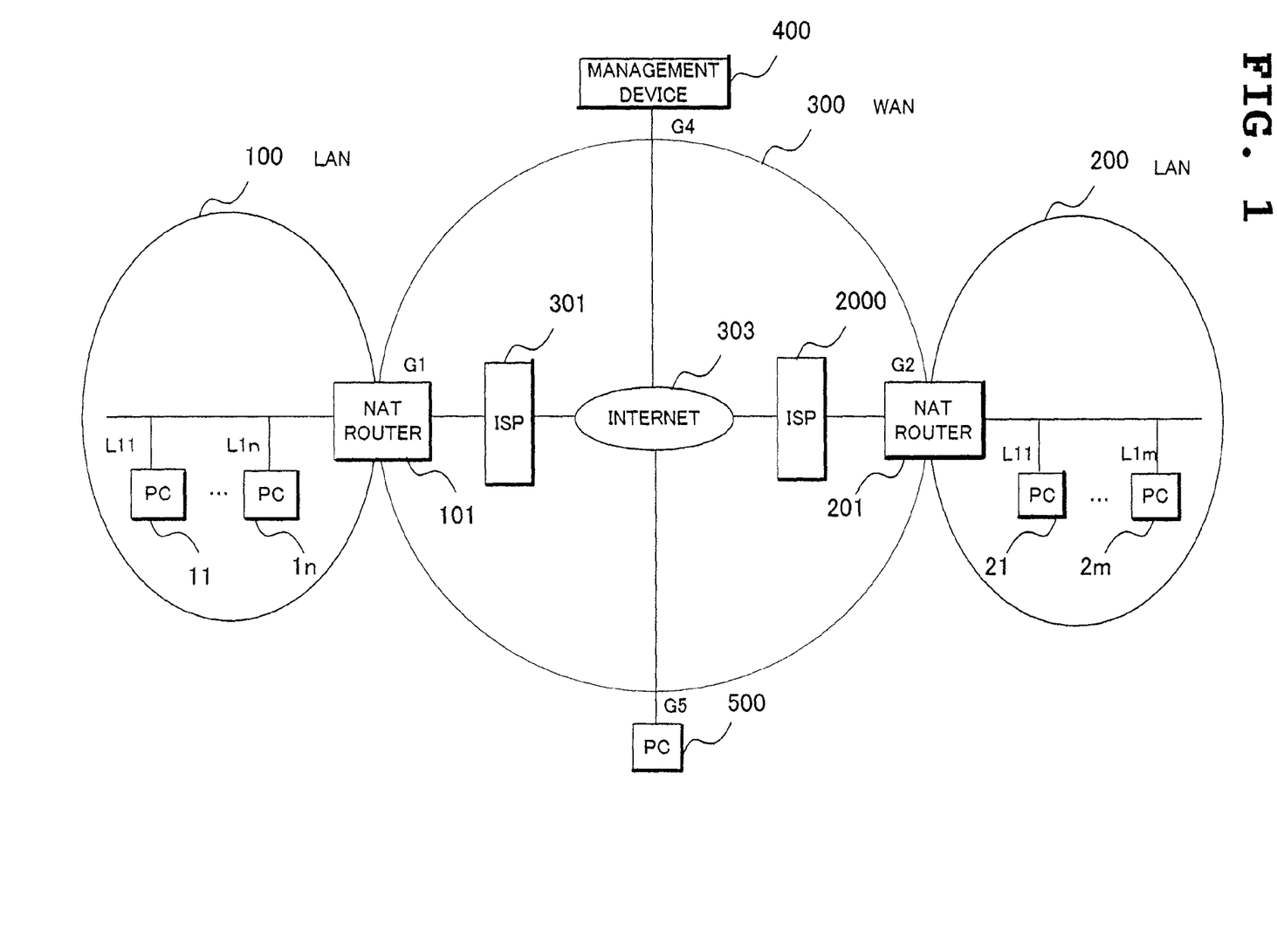
FIG. 1 is a block diagram showing an exemplary embodiment of the invention.

Referring to FIG. 1, in a first exemplary embodiment of the invention, a LAN (Local Area Network) 100 and a LAN 200 are mutually connected to each other through a WAN (Wide Area Network) 300.

A plurality of PCs (Personal Computers) 11 to 1n and a NAT router 101 are connected on the LAN 100. The NAT router 101 is connected in a boundary portion between the LAN 100 and the WAN 300. Similarly to the above, a plurality of PCs 21 to 2m and a NAT router 201 are connected on the LAN 200. The NAT routers 101 and 201 have a DHCP server function on the LAN side and a DHCP client function on the WAN side in addition to a NAT function and a routing function. Though the NAT router is taken as an example of a device having a network address conversion function in the exemplary embodiment, the invention can be applied to any other named device such as a broad band router as far as it has the network address conversion function.

An ISP (Internet Service Provider) 301 is connected to the NAT router 101 on the side of the WAN 300, an ISP 302 is connected to the NAT router 201 on the side of the WAN 300, and the ISP 301 and the ISP 302 are connected to each other through the Internet 303. A management device 400 and a PC 500 are connected to the Internet 303.

Next, a schematic of operation of the exemplary embodiment will be described.

Now, assume that a global IP address G1 is assigned to the NAT router 101 by the ISP 301 and a global IP address G2 is assigned to the NAT router 201 by the ISP 302. The global IP address of the management device 400 is defined as G4 and the global IP address of the PC 500 is defined as G5. The respective local IP addresses L11 to L1n are assigned to the respective PCs 11 to 1n within the LAN 100 from the NAT router 101 and the respective local IP addresses L11 to L1m are assigned to the respective PCs 21 to 2m within the LAN 200 from the NAT router 201.

When the PC 11 with the local IP address L11 assigned there communicates with, for example, the PC 500 through the Internet 303, the G5 is set as a transfer destination address, the L11 is set as a transfer source address, and a packet with the source port number, for example, Px is transmitted to the LAN 100. The packet is captured by the NAT router 101 and transferred to the WAN 300 side. At the time, in the NAT router 101, the transfer source address within the packet is converted. For example, when a conversion table (not illustrated) included in the NAT router 101 describes that a pair of the local IP address L11 and the port number Px is converted into a pair of the global IP address G1 and the port number P1, the transfer source address within the packet is converted into the G1 and the transfer source port number is converted into the P1 to be transferred to the WAN 300. The packet is transferred to the PC 500 having the transfer destination address G5.

The PC 500 recognizes who is a communicating party according to the transfer source address G1 and the transfer source port number P1 within the received packet. When it makes a response to the communicating party, it transmits to the WAN 300 the packet with the transfer destination address set at G1, the transfer destination port number set at P1, and the transfer source address set at G5, this own IP address. This packet is transferred to the NAT router 101 having the transfer source address G1. The NAT router 101 converts the transfer destination address into L11 and the transfer destination port number into Px according to the contents of the above mentioned conversion table and transfers the packet to the LAN 100. The packet is received by the PC 11 having the transfer destination address L11.

In this way, the PC 11 apparently behaves like a PC having the global IP address G1. This is the same as the other PCs 12 to 1n than the PC 11 of the LAN 100 and the PC 21 to 2m of the other LAN 200. As is clear from the above description, the respective PCs 11 to 1n and PCs 21 to 2m recognize the respective local IP addresses assigned for themselves as their own IP addresses and the PCs do not know that the own IP address within the packet transferred by each of them is converted and what is the IP addresses rewritten. When providing the respective PCs 11 to 1n and 21 to 2m with a function for obtaining own IP address and then transferring it to the management device 400, generally, the local IP addresses assigned to themselves are transferred to the management device 400. As apparent from the example that the same local IP address L11 is assigned to the PC 11 of the LAN 100 and the PC 21 of the LAN 200, the local IP address does not correspond to the geographical position in one to one so that it cannot be used for the management of the position of PCs.

In the exemplary embodiment, each PC to be managed is provided with a function for searching for a NAT router inside the LAN this PC is connected to and a function for obtaining the global IP address used for the address conversion from the searched NAT router, and it transfers the global IP address obtained by the function to the management device 400 as the own positional information. Hereinafter, the detail will be described.

Figure 2:
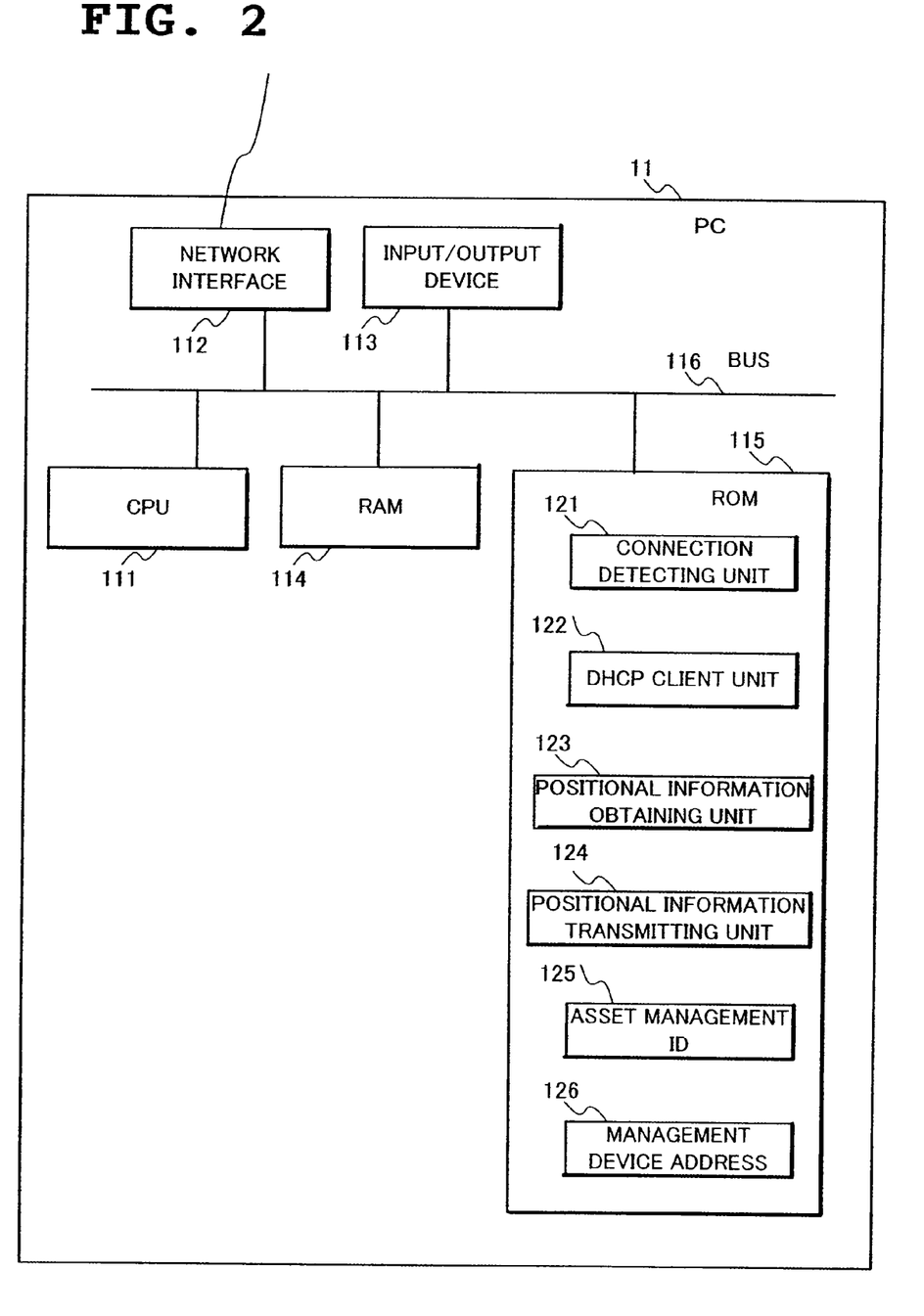
FIG. 2 is a block diagram of an information processor according to the exemplary embodiment of the invention.

Referring to FIG. 2, an example of the PC 11 comprises a CPU 111, a network interface 112, an input/output device 113, a RAM 114, a ROM 115, and a bus 116 for connecting the above to each other. The other PCs 12 to 1n and 21 to 2m to be managed also have the same structure as the PC 11.

The network interface 112 is a connecting portion between the PC 11 and the network. Though the PC 11 in this example comprises only one network interface 112, the PC may comprise a plurality of network interfaces. The input/output device 113 is formed by a keyboard and a display. The ROM 115 is a nonvolatile memory for storing a program and fixed data. The RAM 114 is a readable and writable memory, used for storing the program and the data temporarily. The CPU 111 controls the whole of the PC 11 by performing the program stored in the ROM 115.

Various programs and data are stored in the ROM 115, and as the things relating to the invention, a connection detecting unit 121, a DHCP client unit 122, a positional information obtaining unit 123, a positional information transmitting unit 124, an asset management ID 125, and a management device address 126 are stored in the ROM. These are installed, for example, in one portion of the operating system. One or all of the connection detecting unit 121, the DHCP client unit 122, the positional information obtaining unit 123, the positional information transmitting unit 124, the asset management ID 125, and the management device address 126 stored in the ROM 115 may be stored in the RAM 114.

The connection detecting unit 121 is to detect that the network interface 112 is connected to the network.

The DHCP client unit 122 is to obtain the IP address and the other information from the DHCP server when connecting to the network.

The positional information obtaining unit 123 is to find a NAT router, obtain the global IP address and the other data, and create the positional information to be sent to the management device 400.

The positional information transmitting unit 124 is to transmit the created positional information to the management device 400 through the network interface 112.

The asset management ID 125 is a character string for uniquely identifying this PC 11. The management device address 126 is a communication address of the management device 400, corresponding to the global IP address G4 in the above mentioned example.

Figure 3:
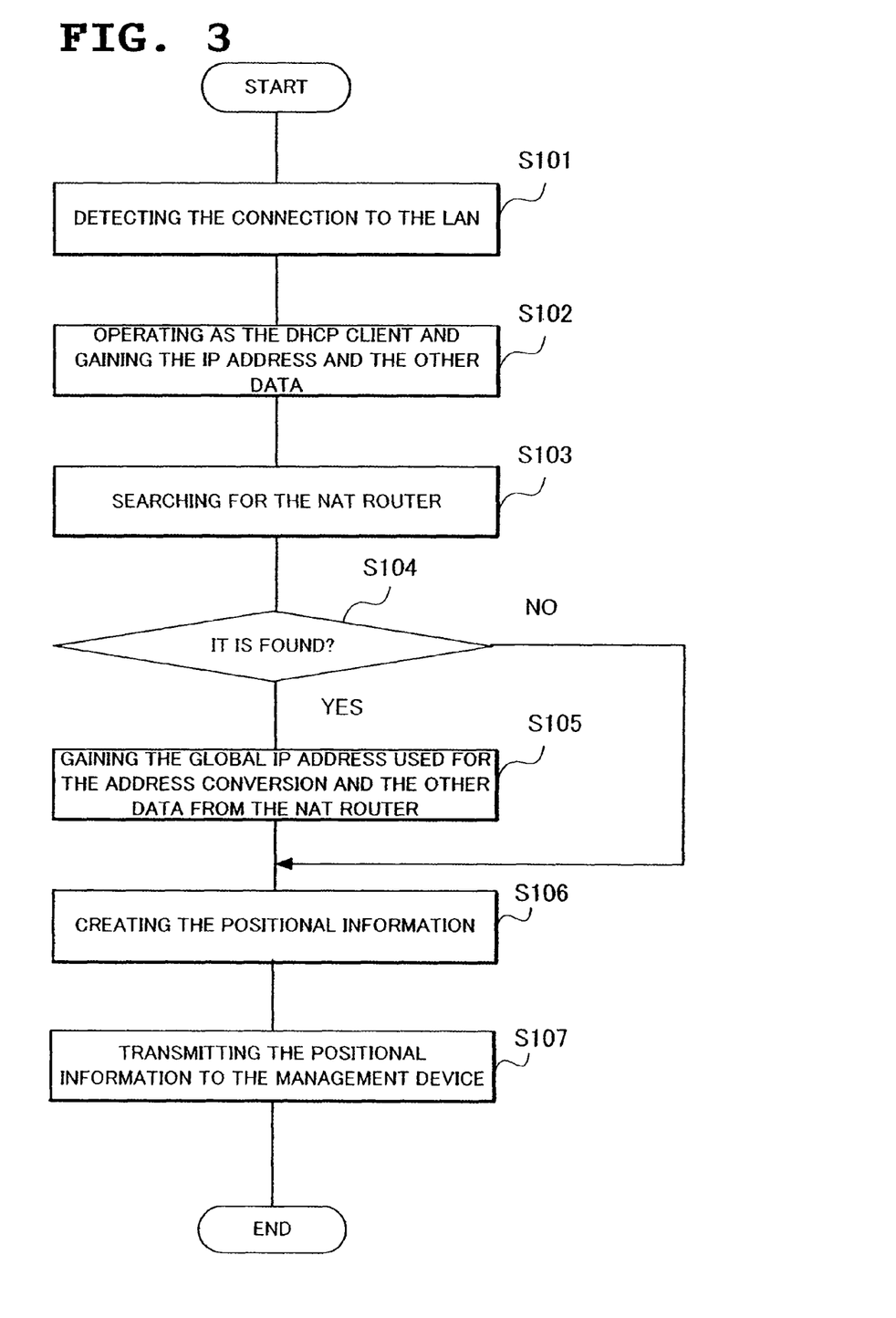
FIG. 3 is a flow chart showing an example of the processing performed by the information processor according to the exemplary embodiment of the invention at a time of access to a network.

An example of the processing performed by the PC 11 at the access to the LAN is shown in FIG. 3. Hereinafter, the operation at that time will be described taking, for example, the case where the PC 11 is connected to the LAN 100 as shown in FIG. 1.

When the PC 11 is connected to the LAN 100 by inserting the LAN cable into the network interface 112, the connection detecting unit 121 detects the connection (Step S101). The DHCP client unit 122 transfers a request for the IP address to the LAN 100 through a broadcast and obtains the IP address and the other information from the DHCP server (Step S102). In this example, the NAT router 101 has a DHCP server function on the LAN side and assigns the IP address L11 to the PC11. As the other information, the IP address of the DNS server obtained from the ISP 301 is informed to the PC 11.

Next, the positional information obtaining unit 123 searches for the NAT router 101 from the LAN 100 (Step S103), and when it finds it (YES in Step S104), it obtains the global IP address and the other data used for the address conversion from the NAT router 101 (Step S105). As an example of a communication protocol realizing the above operation, an UPnP (Universal Plug and Play) that is the communication protocol of finding and calling service (device) in a short distance may be used. The global IP address used for the address conversion corresponds to the G1 in the above mentioned example. When a plurality of global IP addresses are distributed to the NAT router 101 by the ISP 301, it is preferable that the global IP address G1 used for the address conversion of the local IP address L11 of the PC 11 is obtained from the above addresses, but the other global IP address will do. As the other data obtained together with the global IP address from the NAT router 101, there is a domain name corresponding to the relevant global IP address.

The positional information obtaining unit 123 creates the positional information to be informed to the management device 400 regardless of the presence or absence of the NAT router (Step S106). The created positional information includes the following information.

1) When the global IP address is obtained from the NAT router
   a) asset management ID 125
   b) global IP address obtained from the NAT router
   As a modification example, instead of or in addition to the global IP address of b), domain name obtained from the NAT router may be included. The IP address obtained from the NAT router in Step S102 and the IP address of the DNS server may be included. The domain name may be obtained by the positional information obtaining unit 123 inquiring the domain name corresponding to the IP address obtained from the NAT router of the DNS server.
2) When the NAT router is not found
   a) asset management ID 125
   b) IP address obtained in Step S102

As a modification example, instead of or in addition to the IP address of b), the domain name corresponding to the IP address may be included.

In addition, the type of a device used for the network connection (LAN card, PHS, and the like), a manufacture name of the device (company name), and a serial number of the device may be included in the positional information in both 1) and 2).

The positional information transmitting unit 124 transmits the created positional information to the management device 400 identified by the management device address 126, through the network interface 112 (Step S107).

Figure 4:
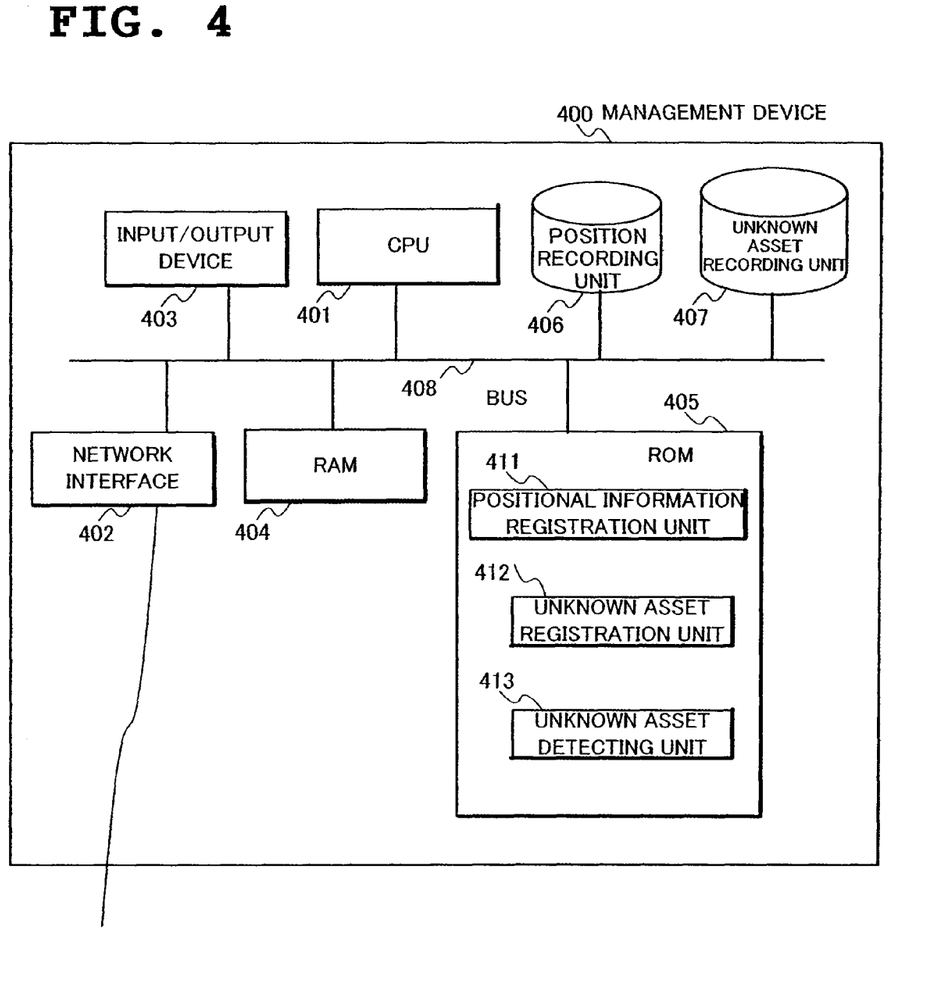
FIG. 4 is a block diagram of a management device according to the exemplary embodiment of the invention.

Referring to FIG. 4, an example of the management device 400 comprises a CPU 401, a network interface 402, an input/output device 403, a RAM 404, a ROM 405, a position recording unit 406, an unknown asset recording unit 407, and a bus 408 connecting the above to each other.

The network interface 402 is a portion for connecting the management device 400 and the network. The input/output device 403 is formed by a keyboard and a display. The ROM 405 is a nonvolatile memory for storing a program and the fixed data. The RAM 404 is a readable and writable memory, used for storing the program and the data temporarily. The position recording unit 406 and the unknown asset recording unit 407 are respectively formed by, for example, a hard disk. The position recording unit 406 stores the positional information for every PC to be managed. The unknown asset recording unit 407 stores the asset management ID of a lost PC. The CPU 401 controls the whole management device 400 by performing the program stored in the ROM 405.

Various programs are stored in the ROM 405 and as things relating to the invention, a positional information registration unit 411, an unknown asset registration unit 412, and an unknown asset detecting unit 413 may be stored in the ROM 405. These exist, for example, as an application program. One or all of the positional information registration unit 411, the unknown asset registration unit 412, and the unknown asset detecting unit 413 stored in the ROM 405 may be stored in the RAM 404.

The positional information registration unit 411 is to register the positional information supplied from each PC through the network interface 402 into the position recording unit 406.

The unknown asset registration unit 412 is to register the asset management ID of a lost PC into the unknown asset recording unit 407. The asset management ID of the lost PC is entered, for example, by a manager through the input/output device 403.

Every time the unknown asset registration unit 412 newly registers the positional information in the position recording unit 406, the unknown asset detecting unit 413 is to detect the use of a lost PC by comparing the asset management IDs within the registered positional information with the asset management ID stored in the unknown asset recording unit 407.

Figure 5:
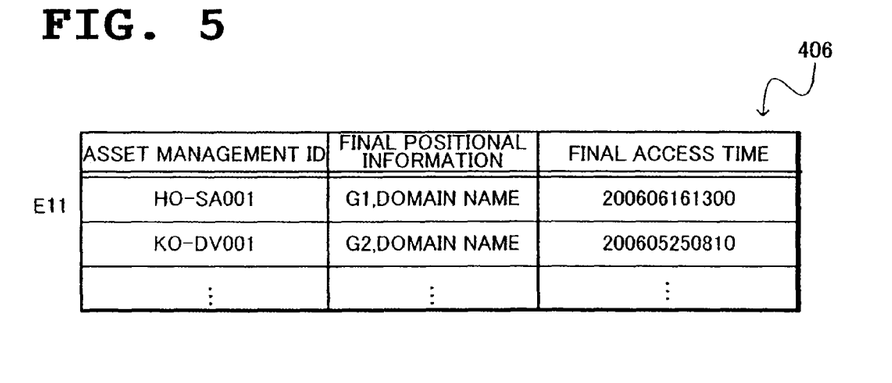
FIG. 5 is a view showing a constitutional example of a position recording unit of the management device according to the exemplary embodiment of the invention.

Referring to FIG. 5, the position recording unit 406 has each entry E11 corresponding to each PC to be managed in one to one and the entry E11 includes the asset management ID, the final positional information, and the final access time of the corresponding PC.

Figure 6:
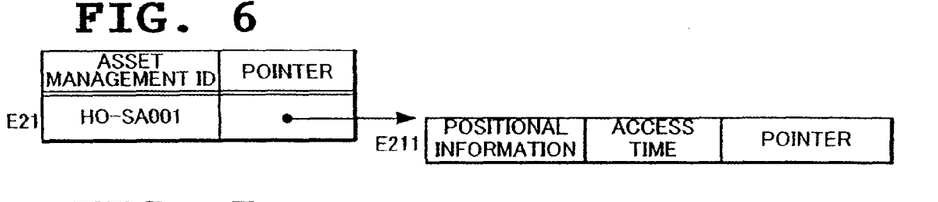
FIG. 6 is a view showing a constitutional example of an unknown asset recording unit of the management device according to the exemplary embodiment of the invention.

Referring to FIG. 6, the unknown asset recording unit 407 has each entry E21 corresponding to the lost PC in one to one and the entry E21 includes the asset management ID and a pointer to the positional information entry E211 of the corresponding PC. When there is no positional information entry E211, the pointer is NULL. The positional information entry E211 includes the positional information, the access time, and the pointer to the next positional information entry E211. When there is no next positional information entry E211, the pointer is NULL.

Figure 7:
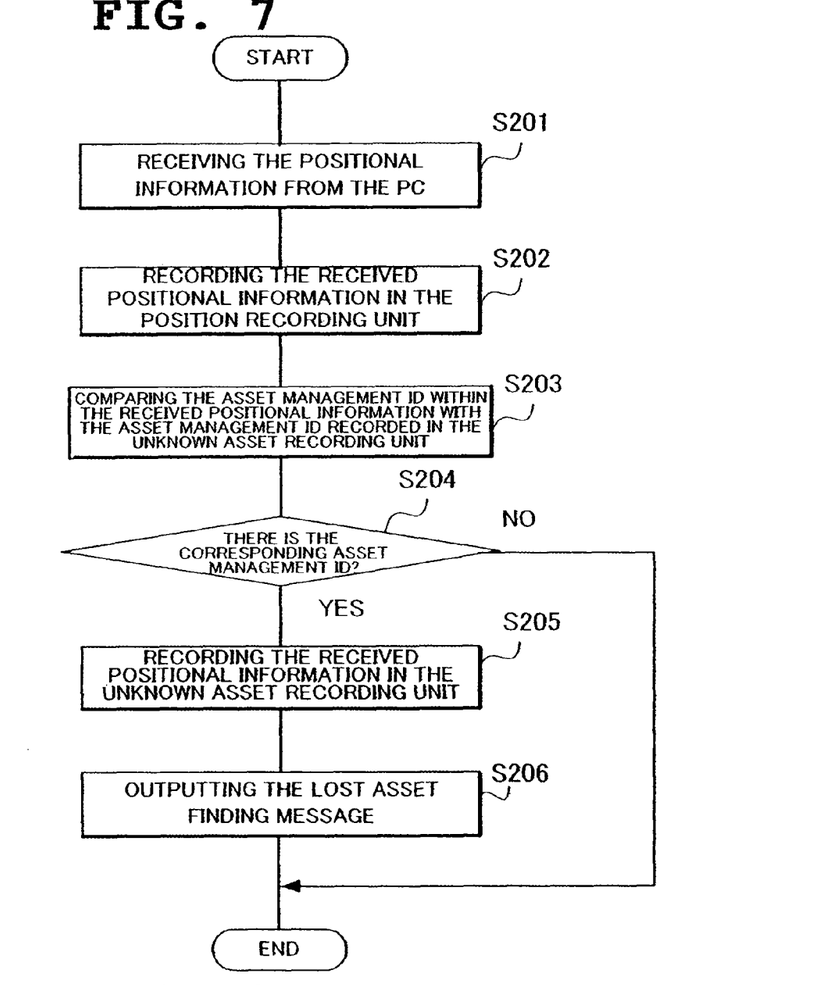
FIG. 7 is a flow chart showing an example of the processing performed when the management device according to the exemplary embodiment of the invention receives the positional information from the information processor.

An example of the processing of the management device 400 when receiving the positional information from the PC to be managed is shown in FIG. 7. Hereinafter, the operation at that time will be described taking for example, the case where the PC11 is connected to the LAN 100 as shown in FIG. 1. Assume that the asset management ID of the PC 11 is HO-SA001.

When the PC11 transmits the positional information including, for example, the asset management ID=HO-SA001, the global IP address G1, and the domain name to the management device 400, the network interface 402 of the management device 400 receives the information (Step S201). Next, the positional information registration unit 411 searches for the entry E11 having the same asset management ID as that included in the received positional information from the position recording unit 406, rewrites the data in the final positional information in the entry E11, into the data of the global IP address G1 and the domain name included in the positional information which is received at this time, and rewrites the data in the final access time into the time of receiving this positional information (Step S202). The received positional information and the time set in the final access time are informed to the unknown asset detecting unit 413.

The unknown asset detecting unit 413 checks whether the unknown asset recording unit 407 stores the asset management ID corresponding to the asset management ID included in the informed positional information (Step S203), and when there is no corresponding asset management ID (NO in Step S204), it finishes the processing. On the other hand, when there is the corresponding asset management ID (YES in Step S204), the unknown asset recording unit 407 stores the informed positional information (Step S205). Specifically, the positional information entry E211 including the positional information received at this time, the informed time, and the NULL value is created, and it is connected to the end of a chain consisting of more than zero (*) positional information entry E211 with the pointer of the entry E21 having the corresponding asset management ID. The unknown asset detecting unit 413 displays a message of finding an unknown asset with its asset management ID on the display of the input/output device 403 (Step S206).

Next, an effect of the exemplary embodiment will be described.

It is possible to manage the geographical positions of the PCs to be managed. This is because each PC to be managed transmits the positional information including the global IP address capable of specifying the position of the self PC or the corresponding domain name to the management device and the management device stores the information in the position recording unit every time it newly gains access to the network. How much degree the geographical position is known from the global IP address or the corresponding domain name depends on each case. For example, there are the case where only a country and an area are known and the case where a prefecture, city, town, village, and an organization it belongs to (company and school) are known.

It is possible to detect access of a lost PC to a network. This is because since the unknown asset recording unit stores the asset management ID of the lost PC, the management device detects the agreement between the asset management ID within the positional information transmitted by the lost PC every time it newly gains access to the network and the asset management ID registered in the unknown asset recording unit.

It is possible to gain an access history of a lost PC to the network and a movement history of the geographical position. This is because the positional information transmitted from the lost PC every time it newly gains access to the network is stored in the position recording unit 406 as the access history. Owing to this, the lost PC can be pursued easily.

It is possible to guard against a PC that is the asset of a company being stolen. This is because when a PC illegally taken out is used having access to a network, the geographical position of the PC is specified according to its global IP address and in the criminal investigation, the police can obtain the personal information of a person who uses a specified IP address at a specified time, referring to a provider. It is thought that few people take out a PC illegally under such a situation.

Although the exemplary embodiment of the invention has been described as mentioned above, the invention is not limited to the above example and various additions and modifications are possible. For example, the exemplary embodiment as follows may be included in the invention.

1) Though the position recording unit 406 shown in the example of FIG. 5 records the final positional information and access time of a PC to be managed, the past positional information and access time may be preserved as the history without clearing.

Figure 8:
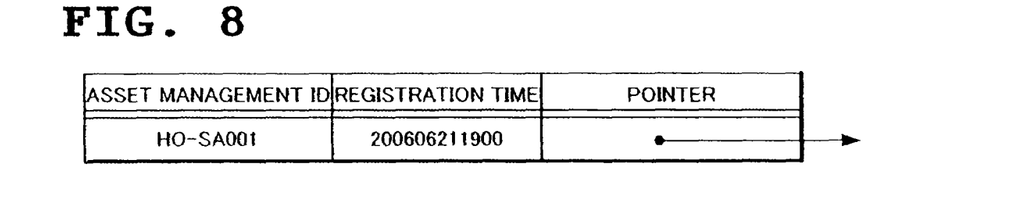
FIG. 8 is a view showing a constitutional example of the unknown asset recording unit according to another exemplary embodiment of the invention.

2) In the processing of FIG. 7, though the unknown asset detecting unit 413 performs the processing of detecting whether the unknown asset recording unit 407 registers the asset management ID within the received positional information in synchronization with the receipt of the new positional information, the detection processing may be performed asynchronously to the receipt of the positional information. In this case, as shown in FIG. 8, the unknown asset recording unit 407 stores the asset management ID together with the time information of registering the same ID. The unknown asset detecting unit 413 performs the processing shown in FIG. 9, for example, batch processing late at night. The operation at that time is as follows.

Figure 9:
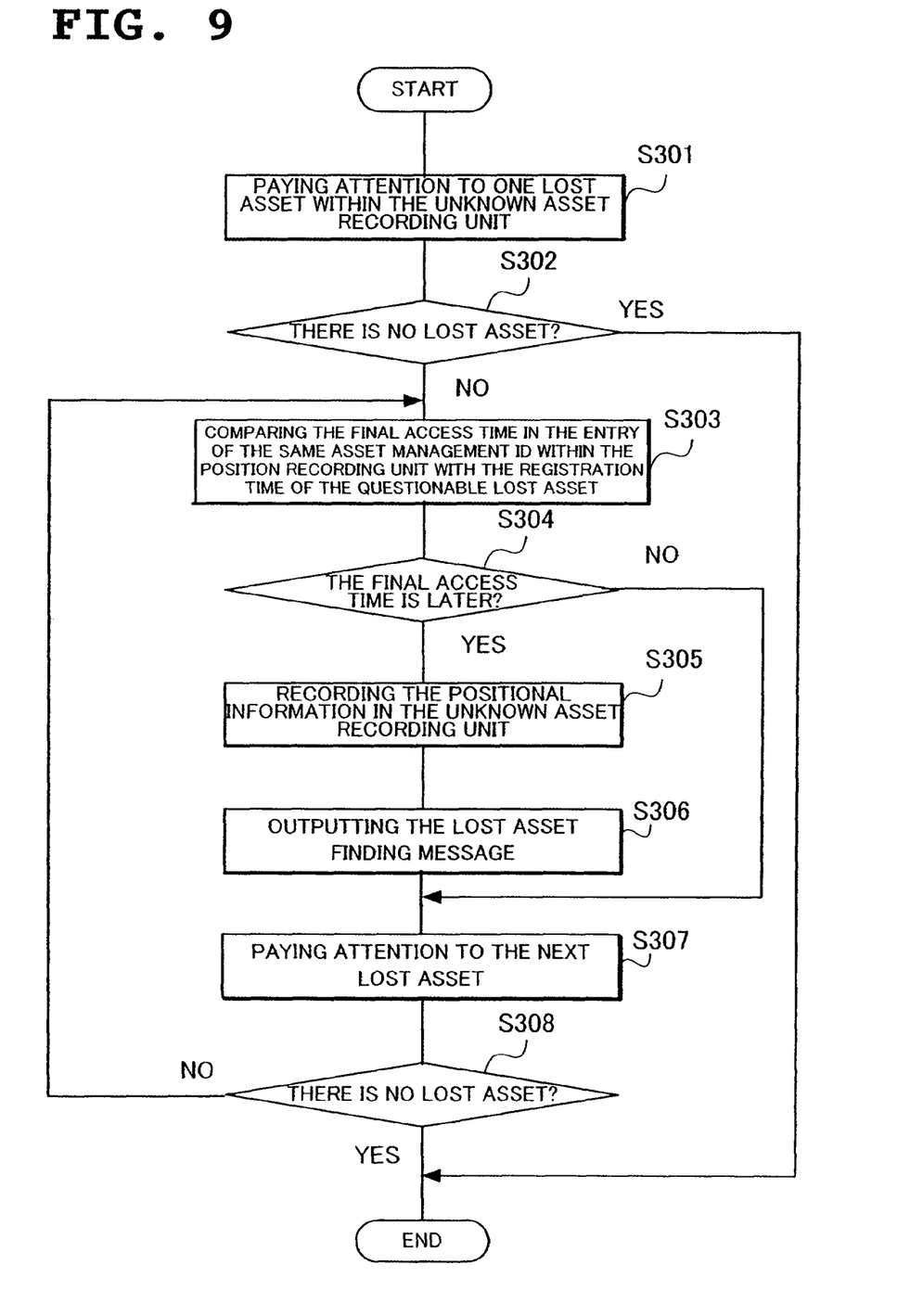
FIG. 9 is a flow chart showing the processing example of the unknown asset detecting unit according to the other exemplary embodiment of the invention.

The unknown asset detecting unit 413 pays attention to one lost asset stored in the unknown asset recording unit 407 (Step S301). When there is no lost asset (YES (NO*) in Step S302), the processing of FIG. 9 is finished. When there is a questionable lost asset (NO (YES*) in Step S302), the final access time in the entry of the same asset management ID as the lost asset within the position recording unit 406 is compared with the registration time of the lost asset (Step S303). When the final access time is not later than the registration time (NO in Step S304), the processing proceeds to Step S307. When the final access time is later than the registration time (YES in Step S304), the positional information of the final access time is read out from the position recording unit 406 and stored in the unknown asset recording unit 407 (Step S305), and a lost asset finding message describing the asset management ID of the lost asset is displayed on the display of the input/output device 403 (Step S306). The processing proceeds to Step S307. In Step S307, attention is paid to the next one lost asset stored in the unknown asset recording unit 407 and the processing is returned to Step S303, the same processing as the above is repeated. When there is no lost asset (YES (NO*) in Step S308), the processing of FIG. 9 is finished.

3) In the above exemplary embodiment, although a PC is used as a target for asset management, an information processor other than the PC may be the target for asset management.

According to a second exemplary embodiment of the invention, the management device includes an unknown asset recording unit which records the identification information of a lost information processor and an unknown asset detecting unit which detects that the positional information including the same identification information as that recorded in the unknown asset recording unit is recorded in the position recording unit.

According to a third exemplary embodiment of the invention, an asset management method includes a first step in which an information processor having a communication function searches for a network address converter for converting between a local IP address and a global IP address from a connected network, a second step in which the information processor transmits the positional information including at least one of the global IP address of the searched network address converter and a domain name corresponding to the global IP address and the identification information of this information processor to a management device through the communication function, and a third step in which the management device records the positional information supplied from the information processor in the position recording unit.

According to a fourth exemplary embodiment of the invention, a asset management method further includes a fourth step in which, in the first asset management method, the management device detects that the positional information including the same identification information as that recorded in the unknown asset recording unit which records the identification information of a lost information processor is recorded in the position recording unit.

According to a fifth exemplary embodiment of the invention, an information processor is an information processor having a communication function, comprising a search unit which searches for a network address converter for converting between a local IP address and a global IP address from a network this processor connects to and a position registration unit which transmits the positional information including at least one of the global IP address of the searched network address converter and a domain name corresponding to the global IP address and the identification information of this information processor to a management device through the communication function.

According to a sixth exemplary embodiment of the invention, in an information processor, when failing in the search, the position registration unit transmits the positional information including at least one of an IP address assigned to this processor and the domain name corresponding to the IP address and the identification information of this information processor to the management device through the communication function.

According to a seventh exemplary embodiment of the invention, a management device is communicable with one or more information processors having a function for transmitting the positional information including at least one of the global IP address of a network address converter, which converts between a local IP address and a global IP address in a network this processor connects to, and a domain name corresponding to the global IP address and the identification information of this information processor, and it includes a position recording unit which records the positional information of every information processor and a positional information registration unit which records the positional information supplied from the information processor in the position recording unit.

According to an eighth exemplary embodiment of the invention, a management device includes an unknown asset recording unit which records the identification information of a lost information processor and an unknown asset detecting unit which detects that the positional information including the same identification information as that recorded in the unknown asset recording unit is recorded in the position recording unit.

Since the information processor connected to a network searches for the network address converter which converts between the local IP address and the global IP address from the network and when succeeding in the search, it operates to transmit the positional information including at least one of the global IP address of the above network address converter and the domain name corresponding to the above global IP address and the identification information of this information processor to the management device, even when information processor is set in an environment where the NAT operates, the management device can manage the global IP address useful to specify the position of the information processor or the corresponding domain name.

According to the invention, under the environment having the network address converter such as NAT, it is possible to manage the position of each information processor with the global IP address or corresponding domain name effective as the positional information. This is because each information processor to be managed has a function for searching for the network address converter such as the NAT router from the own network this processor connects to and a function for gaining at least one of the global IP address used for the address conversion and its corresponding domain name from the searched network address converter, and it transmits at least one of the global IP address and its corresponding domain name gained by these functions to the management device as the self positional information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2006-203134, filed on Jul. 26, 2006, the disclosure of which is incorporated herein in its entirety by reference.

What is claimed is:
1. An asset management system, comprising:
one or more information processors having a communication function and a management device which manages a geographical position of said one or more information processors, wherein
said one or more information processors comprise:
a search unit which searches for a network address converter for converting between a local IP address and a global IP address in a network;
a positional information obtaining unit which creates positional information including at least one of said global IP address of said searched network address converter and a domain name corresponding to said global IP address and identification information of the information processor; and a position information transmitting unit which transmits said positional information to said management device, said management device comprises:

a positional information registration unit which records said positional information received from said information processor in a position recording unit, wherein when failing in said searching for the network address converter, said positional information obtaining unit creates said positional information including at least one of an IP address assigned to the information processor and the domain name corresponding to the IP address and the identification information of the information processor.

2. The asset management system according to claim 1, wherein said management device comprises an unknown asset recording unit which records identification information of a lost information processor, and an unknown asset detecting unit which detects that said positional information including the same identification information as said identification information recorded in said unknown asset recording unit is recorded in said position recording unit.

3. An asset management method, comprising:

in an information processor, a searching step of searching for a network address converter for converting between a local IP address and a global IP address in a network;

a positional information obtaining step of creating positional information including at least one of said global IP address of said searched network address converter and a domain name corresponding to said global IP address and identification information of the information processor;

a transmitting step of transmitting said positional information to a management device which manages a geographical position of said information processor; in said management device, a registration step of recording said positional information received from said information processor in a position recording unit, wherein when failing in said searching for the network address converter, said positional information obtaining step creates said positional information including at least one of an IP address assigned to the information processor and the domain name corresponding to the IP address and the identification information of the information processor.

4. The asset management method according to claim 3, wherein said management device includes a step of detecting that said positional information including the same identification information as said identification information recorded in said unknown asset recording unit which records identification information of a lost information processor is recorded in said position recording unit.

5. An information processor having a communication function, comprising:

a search unit which searches for a network address converter for converting between a local IP address and a global IP address in a network;

a positional information obtaining unit which creates positional information including at least one of said global IP address of said searched network address converter and a domain name corresponding to said global IP address and identification information of the information processor; and a position information transmitting unit which transmits said positional information to a management device which manages a geographical position of the information processor, wherein when failing in said searching for the network address converter, said positional information obtaining unit creates said positional information including at least one of an IP address assigned to the information processor and the domain name corresponding to the IP address and the identification information of the information processor.

6. A management device for managing a geographical position of one or more information processors having a communication function, comprising:

means for receiving unit which receives positional information including at least one of a global IP address of a network address converter, which converts between a local IP address and the global IP address in a network, and a domain name corresponding to the global IP address and identification information of said information processor from said information processor, a position recording unit which records said positional information of said one or more information processors, a positional information registration unit which records said positional information received from said information processor in said position recording unit, an unknown asset recording unit which records identification information of a lost information processor, and an unknown asset detecting unit which detects that said positional information including the same identification information as the identification information recorded in said unknown asset recording unit is recorded in said position recording unit.

7. A program performed by a computer forming an information processor having a communication function, comprising:

a searching function of searching for a network address converter which converts between a local IP address and a global IP address in a network;

a positional information obtaining function of creating positional information including at least one of said global IP address of said searched network address converter and a domain name corresponding to said global IP address and identification information of the information processor; and a position transmitting function of transmitting said positional information to a management device which manages a geographical position of said information processor, wherein when failing in said searching for the network address converter, said positional information obtaining function creates said positional information including at least one of an IP address assigned to the information processor and the domain name corresponding to the IP address and the identification information of the information processor.

8. A program performed by a computer forming a management device for managing a geographical position of one or more information processors having a communication function, comprising:

a function of receiving positional information including at least one of a global IP address of a network address converter, which converts between a local IP address and the global IP address in a network, and a domain name corresponding to the global IP address and identification information of said information processor from said information processor,
 a position recording function of recording said positional information of said one or more information processors,
a positional information registration function of recording said positional information received from said information processor in a position recording unit, an unknown asset recording function of recording identification information of a lost information processor, and
an unknown asset detecting function of detecting that the positional information including the same identification information as the identification information recorded in an unknown asset recording unit is recorded in said position recording unit.

\* \* \* \* \*